US008275745B2

(12) United States Patent  
Reddy et al.

(10) Patent No.: US 8,275,745 B2
(45) Date of Patent: Sep. 25, 2012

(54) SECURE INCREMENTAL UPDATES TO HIERARCHICALY STRUCTURED INFORMATION

(75) Inventors: Prakash Reddy, Fremont, CA (US); James A. Rowson, Fremont, CA (US); Eamonn O'Brien-Strain, San Mateo, CA (US); Robert N. Mayo, Mountain View, CA (US); Yuhon Xiong, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1995 days.

(21) Appl. No.: 10/860,977

(22) Filed: Jun. 4, 2004

(65) Prior Publication Data

US 2005/0273471 A1    Dec. 8, 2005

(51) Int. Cl.
*G06F 17/30* (2006.01)
(52) U.S. Cl. ....................................................... 707/624
(58) Field of Classification Search ................... 707/104
See application file for complete search history.

(56) References Cited

U.S. PATENT DOCUMENTS

| | | | |
|---|---|---|---|
| 6,493,721 B1 * | 12/2002 | Getchius et al. | 707/104.1 |
| 2004/0078577 A1 * | 4/2004 | Feng et al. | 713/182 |
| 2004/0187103 A1 * | 9/2004 | Wickham et al. | 717/168 |
| 2005/0018853 A1 * | 1/2005 | Lain et al. | 380/277 |
| 2005/0044016 A1 * | 2/2005 | Irwin et al. | 705/30 |

OTHER PUBLICATIONS

Wikipedia 'XML', the Internet Encyclopedia, last modifed date on Mar. 27, 2007.*
Deutsch et al. "Query Language for XML", Computer Networks, vol. 31, No. 11, 1999.*
Corner et al. "Ubiquitous B-Tree", ACM Computing Surveys, col. 11, Issue 2, p. 121-137, 1979.*
Bertino et al. "An Inlfrasturcture for Managing Secure Update Operation on XML Data", Symposium on Access Control models and Technologies, Jun. 2-3, 2003.*

* cited by examiner

*Primary Examiner* — Yuk Ting Choi

(57) ABSTRACT

Techniques for performing an incremental update to a set of hierarchically structured information that do not expose the structure and content of the hierarchically structured information to unauthorized parties. The present techniques include encrypting the hierarchically structured information such that an arrangement of nodes and corresponding data of the hierarchically structured information is not exposed and each node includes a corresponding node identifier that is not encrypted and updating the hierarchically structured information by referring to the nodes using the node identifiers.

24 Claims, 3 Drawing Sheets

SECURE INCREMENTAL UPDATES TO HIERARCHICALY STRUCTURED INFORMATION

BACKGROUND

A wide variety of information may be represented in a hierarchical structure. One example format for representing information in a hierarchical structure is the extensible markup language (XML) format. An XML document may include an arrangement of nodes containing information and may specify parent-child relationships among the nodes.

Hierarchically structured information may be encrypted to prevent exposing the information to unauthorized parties. For example, an XML document may be encrypted using an encryption key. The information contained in an encrypted XML document may be accessed using an appropriate decryption key.

It may be desirable under a variety of circumstances to apply incremental updates to hierarchically structured information. For example, a computing system may include a variety of processing devices that each generate incremental updates to an XML document. An incremental update may be applied to an encrypted XML document by decrypting all or portions of the XML document, applying the incremental update, and then re-encrypting the XML document.

A processing device that generates an incremental update to hierarchically structured information may be viewed as a trusted device in terms of access to the information. On the other hand, a processing device that applies an incremental update to hierarchically structured information may be viewed as an un-trusted device in terms of access to the information. For example, an XML document may be stored on a network-based information storage facility. As a consequence, an incremental update applied by a data storage facility may expose the unencrypted information in the XML document to unauthorized parties.

SUMMARY OF THE INVENTION

Techniques are disclosed for performing an incremental update to a set of hierarchically structured information that do not expose the structure and content of the hierarchically structured information to unauthorized parties. The present techniques include encrypting the hierarchically structured information such that an arrangement of nodes and corresponding data of the hierarchically structured information is not exposed and each node includes a corresponding node identifier that is not encrypted and updating the hierarchically structured information by referring to the nodes using the node identifiers.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
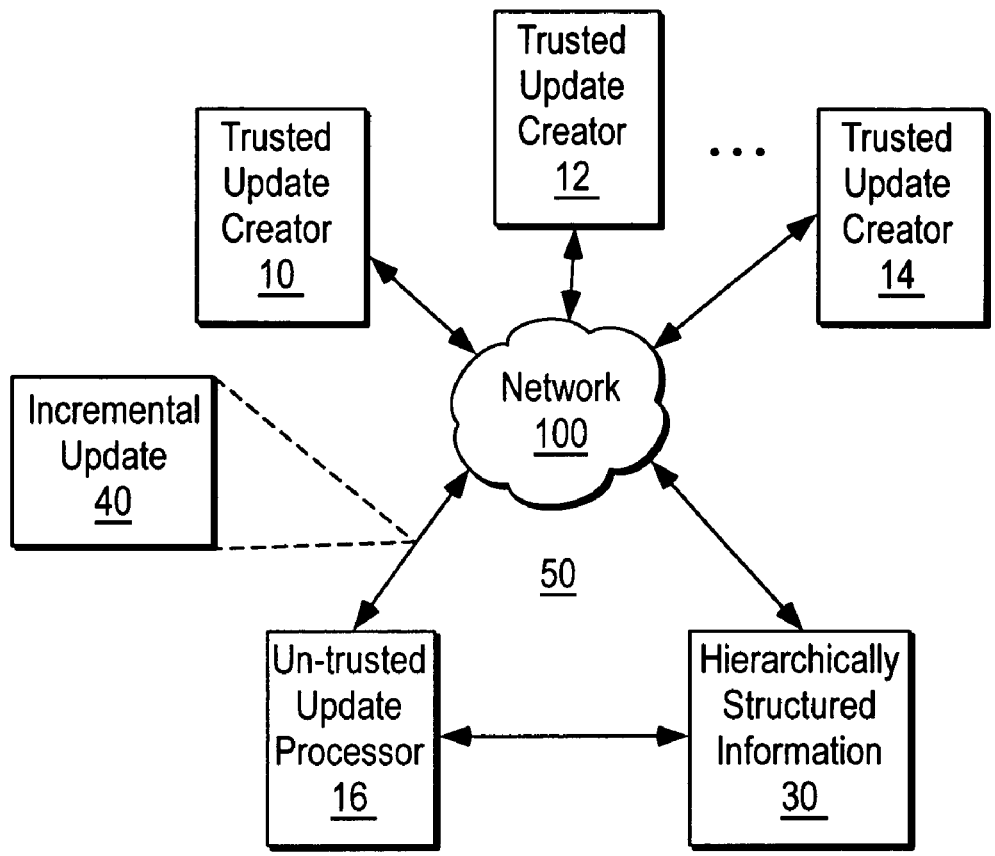
FIG. 1 shows a computing system that incorporates the present techniques.

FIG. 1 shows a computing system 50 that provides incremental updates to a set of hierarchically structured information 30 according to the present techniques. The computing system 50 includes a set of trusted update creators 10-14 and an un-trusted update processor 16. The trusted update creators 10-14 and the un-trusted update processor 16 communicate via a communication network 100.

The trusted update creators 10-14 and the un-trusted update processor 16 may be embodied as any combination of computer systems, server systems, storage systems, database systems, mobile computing devices including personal digital assistants (PDAs), cell phones, etc., as well as more specialized processing devices. The communication network 100 may be embodied as any combination of communication links including public communication links, wireless communication links, Internet communication links, etc.

The trusted update creators 10-14 are trusted with respect to the contents of the hierarchically structured information 30 whereas the un-trusted update processor 16 is not trusted with respect to the contents of the hierarchically structured information 30. For example, the trusted update creators 10-14 may be application programs that generate updates to the contents of the hierarchically structured information 30 and the un-trusted update processor 16 may be a document storage service that provides storage and access to the hierarchically structured information 30. The contents of the hierarchically structured information 30 are encrypted to prevent exposure of the contents to the un-trusted update processor 16.

The trusted update creators 10-14 generate incremental updates, e.g. an incremental update 40, that are to be applied to the hierarchically structured information 30. The un-trusted update processor 16 applies the incremental update 40 to the hierarchically structured information 30 without decrypting the contents of the hierarchically structured information 30.

The unencrypted contents of the hierarchically structured information 30 may be represented as a graph or hierarchical tree structure having an arrangement of nodes and arcs. The hierarchically structured information 30 is encoded and encrypted in such a way as to prevent unauthorized viewing and modification of its content as well as unauthorized viewing of its hierarchical structure. The hierarchical structure of the hierarchically structured information 30 is hidden in order to prevent unauthorized persons from inferring the information contained in the encrypted hierarchically structured information 30 from its hierarchical structure. For example, unauthorized persons are prevented from inferring the information contained in the hierarchically structured information 30 by determining parent-child relationships among its nodes.

Figure 2:
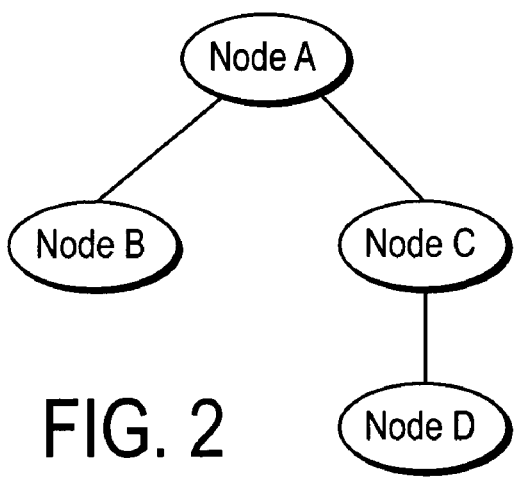
FIG. 2 shows an example representation of a set of hierarchically structured information.

FIG. 2 shows an example representation of the unencrypted contents of the hierarchically structured information 30. The unencrypted contents of the hierarchically structured information 30 are arranged in a set of nodes A-D and interconnecting arcs that define parent-child relationships among the nodes A-D. The node A is the parent of the nodes B and C. The node C is the parent of the node D.

Each node A-D may be represented using a data structure that includes a tag, a set of zero or more attributes, and zero or more text strings. The contents of the data structure for each node A-D that is not the root node of the hierarchically structured information 30 refers to its parent node. The contents of the data structure for each node A-D may refer to an ordered list of child nodes.

An example data structure for representing the unencrypted contents of the hierarchically structured information 30 is a data structure in XML format. An example of the unencrypted contents of the hierarchically structured information 30 in XML format is as follows.

```
<base web="lime.org">
    Ok rock.
    <color>White</color>
    <value basic="cheap">
        <dollars>29.33</dollars>
    </value>
</base>
```

The hierarchically structured information 30 is encrypted in two phases—an encoding phase followed by an encryption phase. In the encoding phase, the hierarchical structure of the unencrypted contents of the hierarchically structured information 30 is flattened into an unordered list of nodes. In the encryption phase, the unordered list of nodes is encrypted.

Figure 3:
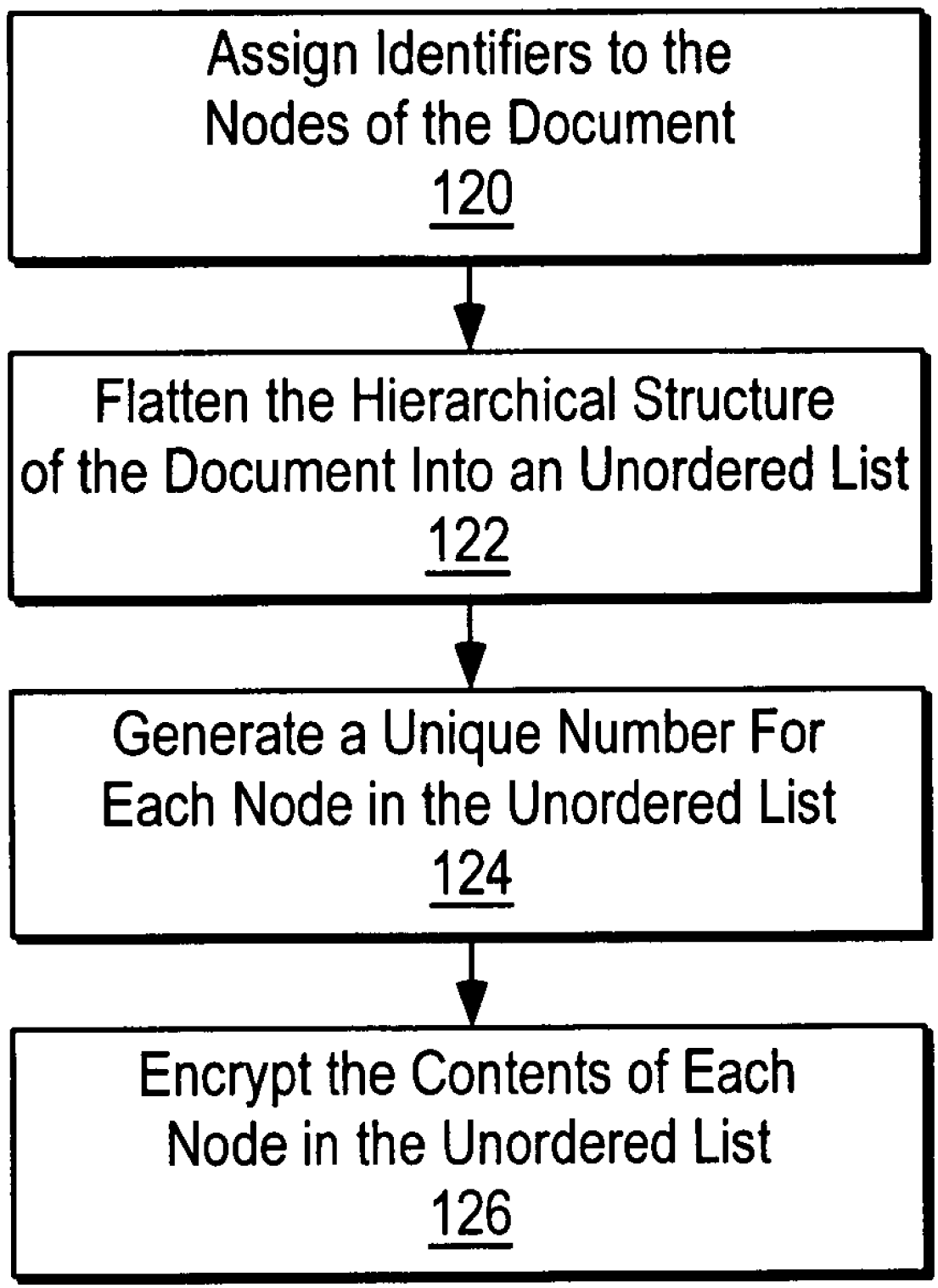
FIG. 3 shows a method for encrypting a set of hierarchically structured information according to the present techniques.

FIG. 3 shows a method for encrypting the hierarchically structured information 30 according to the present techniques. The following description treats the structure of the hierarchically structured information 30 as a set of lines of text, each line of text corresponding to a node and specifies the corresponding parent, if any and corresponding child nodes if any. The structure of the hierarchically structured information 30 may alternatively be represented using other types of data representations, e.g. a set of records in a C programming language data structure.

At step 120, an arbitrary identifier is assigned to each node A-D of the hierarchically structured information 30. The node identifiers remain persistently assigned to the nodes A-D. An example assignment of arbitrary identifiers for the nodes A-D is as follows.

| Node A | 109 |
| Node B | 558 |
| Node C | 971 |
| Node D | 623 |

The textual representation of the hierarchically structured information 30 after step 120 is as follows wherein the node identifiers 109, 558, 971, and 623 are shown below in square brackets.

```
<base [109] web="lime.org">
    Ok rock.
    <color [558]>White</color>
    <value [971] basic="cheap">
        <dollars [623] >29.33</dollars>
    </value>
</base>
```

At step 122, the hierarchical structure of the hierarchically structured information 30 is flattened into an unordered list representing the nodes, i.e. the nodes in the list have no particular order in relation to the hierarchical structure of the hierarchically structured information 30.

The following is an unordered list representation for the example hierarchically structured information 30 after step 122.

[971]parent 109,<value basic="cheap"[623]>

[623]parent 971,<dollars>29.33</dollars>

[109]parent root,<base web="lime.org">Ok rock. [558][971]</base>

[558]parent 109,<color>White</color>

The first entry in the unordered list from step 122 specifies that the node 971 has a parent node 109 and a child node 623. The second entry in the unordered list from step 122 specifies that the node 623 has a parent node 971. The third entry in the unordered list from step 122 specifies that the node 109 is a root node and has child nodes 558 and 971, in that order. The fourth entry in the unordered list from step 122 specifies that the node 558 has a parent node 109.

The ordering of the node identifiers 971, 623, 109, and 558 in the unordered list from step 122 does not reflect the hierarchical structure of the example hierarchically structured information 30. This prevents unauthorized parties from grasping the structure of the hierarchically structured information 30 from the arrangement of the unencrypted node identifiers 971, 623, 109, and 558.

At step 124, a unique number (U) is generated for each node of the unordered list from step 122. For example, the unique number for the node 971 is $U_{971}$ and the unique number for the node 623 is $U_{623}$. The unique number helps ensure the uniqueness in the data of each entry in the unordered list. The unique number may be obtained from a random number generator or another function generator.

At step 126, the contents of each entry in the unordered list is encrypted. The node identifier for each entry in the unordered list is not encrypted. The unordered list representing the hierarchically structured information 30 after step 104 is as follows where the encryption function is E( ).

[971]E($U_{971}$,parent 109,<value basic="cheap"[623]>)

[623]E($U_{623}$,parent 971,<dollars>29.33</dollars>)

[109]E($U_{109}$,parent root,<base web="lime.org">Ok rock. [558][971]</base>)

[558]E($U_{558}$,parent 109,<color>White</color>)

The choice of encryption algorithm, encryption key and the choice of symmetric or asymmetric key may be adapted to particular embodiments. The appropriate decryption key is used to decrypt the hierarchically structured information 30.

Figure 4:
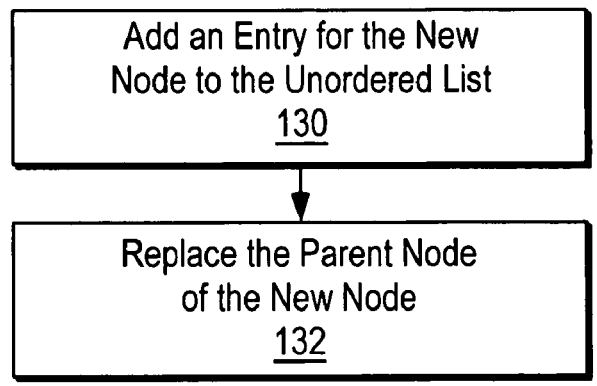
FIG. 4 shows a method for adding a node to a set of hierarchically structured information that is encrypted according to the present techniques.

FIG. 4 shows a method for adding a node to the hierarchically structured information 30. For example, a node E may be added as a child node to the node C. At step 130, a new entry representing the node E is added to the unordered list representing hierarchically structured information 30. The new entry includes a node identifier for the node E. At step 132, the entry of the unordered list representing the parent node of the node E, i.e. the node C, is replaced with a new entry that specifies the new child relationship to the new node E. An entry may be added in an arbitrary place in the unordered list.

Figure 5:
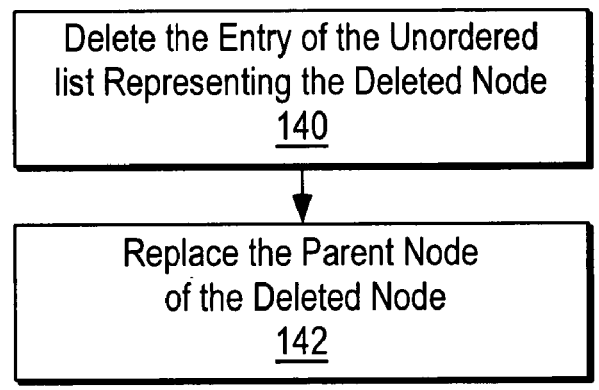
FIG. 5 shows a method for deleting a node from a set of hierarchically structured information that is encrypted according to the present techniques.

FIG. 5 shows a method for deleting a node from the hierarchically structured information 30. For example, the node B may be deleted from the hierarchically structured information 30. At step 140, the entry representing the node B is deleted from the unordered list representing the hierarchically structured information 30. At step 142, the entry in the unordered list representing the parent node of the node B, i.e. the node A, is replaced with a new entry that removes the child relationship with the deleted node.

Figure 6:
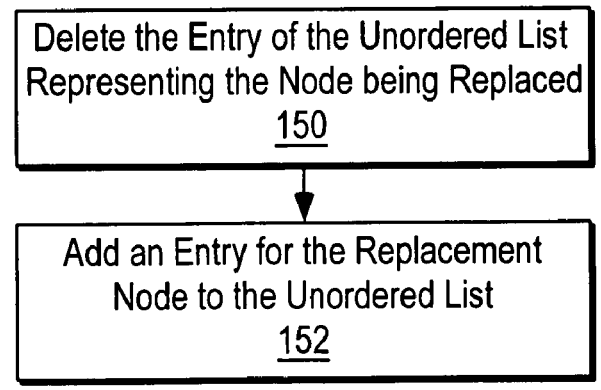
FIG. 6 shows a method for replacing a node in a set of hierarchically structured information that is encrypted according to the present techniques.

FIG. 6 shows a method for replacing a node in the hierarchically structured information 30. For example, the node D may be replaced in the hierarchically structured information 30. At step 150, the entry representing the old node D is deleted from the unordered list representing the hierarchically structured information 30. At step 152, a new entry representing the new node D, the replacement node, is added to the unordered list representing the hierarchically structured information 30. The new entry representing the new node D includes the same identifier for as the old node D.

The incremental update 40 specifies nodes to be added to the hierarchically structured information 30 and/or nodes to be deleted and/or nodes to be replaced from the hierarchically structured information 30. The un-trusted update processor 16 adds nodes to and deletes nodes from the hierarchically structured information 30 in response to the incremental update 40 by identifying entries in the unordered list for the nodes to be added or deleted using the node identifiers. This avoids decrypting the portions of the entries containing node data and parent-child pointers, thereby preventing exposure of the contents and hierarchical structure of the hierarchically structured information 30 to the un-trusted update processor 16 as it applies the incremental update 40 to the hierarchically structured information 30.

The incremental update 40 may specify one or more ADD commands and/or one or more DELETE commands and/or one or more REPLACE commands. An ADD command is used to add a node to the hierarchically structured information 30 and a DELETE command is used to delete a node from the hierarchically structured information 30. A REPLACE command is used to replace a node in the hierarchically structured information 30.

An ADD command in one embodiment is as follows.

ADD id,E(txt)

The "id" parameter of the ADD command is a node identifier for a new node to be added. The "E(txt)" parameter of the ADD command is the encrypted contents for a new entry in the unordered list representing the hierarchically structured information 30 for the new node. The "E(txt)" parameter includes a unique number for the new entry. The un-trusted update processor 16 performs an ADD id, E(txt) command by adding a new entry to the unordered list representing the hierarchically structured information 30 including the node identifier id and E(txt).

A DELETE command in one embodiment is as follows.

DELETE id

The "id" parameter of the DELETE command is a node identifier for a node to be deleted from the hierarchically structured information 30. The un-trusted update processor 16 performs a DELETE id command by deleting the entry from the unordered list representing the hierarchically structured information 30 that is specified by id parameter in the DELETE command.

A REPLACE command in one embodiment is as follows.

REPLACE id,H(E(txt_old)),E(txt)

The "id" parameter of the REPLACE command is a node identifier for a node to be replaced. The "E(txt)" parameter of the REPLACE command is the new encrypted node data. The "H(E(txt_old))" parameter of the REPLACE command is a hash of the old encrypted node data.

The un-trusted update processor 16 performs a REPLACE id, H(E(txt_old)), E(txt) command by computing a hash of the encrypted node data in the entry in the hierarchically structured information 30 identified by the "id" parameter and comparing that hash with H(E(txt_old)) and then replacing the entry in the hierarchically structured information 30 that is identified by the node identifier id with E(txt) if they match. If H(E(txt_old)) does not match the hash of the encrypted node data for the entry in the hierarchically structured information 30 identified by the "id" parameter then the REPLACE id, H(E(txt_old)), E(txt) command is a conflicting attempt to modify a previously modified node which is not allowed. In the case of a conflict of incremental update, the commands are appended to the hierarchically structured information 30 and may later be merged by a trusted node.

The un-trusted update processor 16 applies the incremental update 40 to the hierarchically structured information 30 by performing the specified ADD and DELETE and REPLACE commands without decrypting the individual entries of the hierarchically structured information 30. The un-trusted update processor 16 recognizes the unencrypted node identifiers in the entries of the unordered list and then deletes and adds the specified lines.

The following is a first example of the incremental update 40 for the example hierarchically structured information 30.

ADD 421,$E(U_{421}$,parent 971,<dollars>31.27</dollars>)

REPLACE 971,$E(U'_{971}$,parent 109,<value basic="cheap"[623][421]>)

The ADD command adds a child node to node 971, and the REPLACE command provides an updated parent node 971 including a new unique number $U'_{971}$ and child pointers for the update parent node 971. Alternatively, the same unique number $U_{971}$ may be used.

Before the first example incremental update 40 is applied the example hierarchically structured information 30 is as follows.

[971]$E(U_{971}$,parent 109,<value basic="cheap"[623]>)

[623]$E(U_{623}$,parent 971,<dollars>29.33</dollars>)

[109]$E(U_{109}$,parent root,<base web="lime.org>Ok rock.[558][971]</base>)

[558]$E(U_{558}$,parent 109,<color[558]>White</color>)

After the first example incremental update 40 is applied the example hierarchically structured information 30 is as follows.

[623]$E(U_{623}$,parent 971,<dollars>29.33</dollars>)

[109]$E(U_{109}$,parent root,<base web="lime.org>Ok rock.[558][971]</base>)

[558]$E(U_{558}$,parent 109,<color[558]>White</color>)

[421]$E(U_{421}$,parent 971,<dollars>31.27</dollars>)

[971]$E(U'_{971}$,parent 109,<value basic="cheap"[623][421]>)

The following is a second example of the incremental update 40 for the example hierarchically structured information 30.

DELETE 558

REPLACE 109,E(U'$_{109}$,parent root,<base web="lime.org>Ok rock.[971]</base>)

The DELETE command deletes the node 558, a child node to the root node 109, and the REPLACE command provides an updated root node 109 including a new unique number U'$_{109}$ and updated child pointers.

Before the second example incremental update 40 is applied the example hierarchically structured information 30 is as follows.

[971]E(U$_{971}$,parent 109,<value basic="cheap"[623]>)

[623]E(U$_{623}$,parent 971,<dollars>29.33</dollars>)

[109]E(U$_{109}$,parent root,<base web="lime.org>Ok rock.[558][971]</base>)

[558]E(U$_{558}$,parent 109,<color[558]>White</color>)

After the second example incremental update 40 is applied the example hierarchically structured information 30 is as follows.

[971]E(U$_{971}$,parent 109,<value basic="cheap"[623]>)

[623]E(U$_{623}$,parent 971,<dollars>29.33</dollars>)

[109]E(U'$_{109}$,parent root,<base web="lime.org>Ok rock.[971]</base>)

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer-implemented method for incrementally updating a set of hierarchically structured information, comprising by a computer system:
    encrypting the hierarchically structured information such that an arrangement of nodes and corresponding data of the hierarchically structured information is not exposed and each node includes a corresponding node identifier that is not encrypted, wherein encrypting comprises providing a unique number in the data for each node;
    generating an incremental update to the hierarchically structured information such that the incremental update identifies one or more of the nodes to be updated using one or more of the node identifiers that are not encrypted;
    applying the incremental update to the hierarchically structured information by referring to the nodes using the node identifiers specified in the incremental update.

2. The computer-implemented method of claim 1, wherein applying the incremented update includes:
    deleting a specified node from the hierarchically structured information;
    updating a child pointer in a parent node of the specified node in the hierarchically structured information.

3. The computer-implemented method of claim 2, wherein updating a child pointer comprises:
    deleting the parent node of the specified node from the hierarchically structured information;
    replacing the parent node of the specified node in the hierarchically structured information.

4. The computer-implemented method of claim 1, wherein applying the incremented update includes:
    adding a specified node from the hierarchically structured information;
    updating a child pointer in a parent node of the specified node in the hierarchically structured information.

5. The computer-implemented method of claim 4, wherein updating a child pointer comprises:
    deleting the parent node of the specified node from the hierarchically structured information;
    replacing the parent node of the specified node in the hierarchically structured information.

6. The computer-implemented method of claim 1, wherein encrypting the hierarchically structured information includes:
    arranging the nodes in the hierarchically structured information into an unordered list;
    generating the node identifier for each of the nodes in the unordered list;
    encrypting the data for each node in the list.

7. The computer-implemented method of claim 6, wherein the incremental update specifies a new node including a new node identifier and a new set of encrypted data and applying includes adding the new node to the unordered list.

8. The computer-implemented method of claim 6, wherein the incremental update specifies a node to be deleted and applying includes deleting the specified node from the unordered list.

9. A computing system, comprising:
    a memory storing a set of hierarchically structured information that is encrypted such that an arrangement of nodes and corresponding data of the hierarchically structured information is not exposed and each node includes a corresponding node identifier that is not encrypted, wherein a unique number is provided in the data for each node;
    a first processor that generates an incremental update for the hierarchically structured information such that the incremental update identifies one or more of the nodes to be updated using one or more of the node identifiers that are not encrypted;
    a second processor that applies the incremental update to the hierarchically structured information by referring to the nodes of the hierarchically structured information using the node identifiers specified in the incremental update.

10. The computing system of claim 9, wherein the second processor deletes a node from the hierarchically structured information that is specified in a delete command in the incremental update.

11. The computing system of claim 9, wherein the second processor adds a node to the hierarchically structured information that is specified in an add command in the incremental update.

12. The computing system of claim 9, wherein the incremental update includes an add command for a new node and a replace command for a parent node to the new node.

13. The computing system of claim 9, wherein the incremental update includes a delete command for an existing node in the hierarchically structured information and a replace command for a parent node to the existing node.

14. The computing system of claim 9, wherein the incremental update includes a replace command for an existing node in the hierarchically structured information and a replace command for a parent node to the existing node.

15. A computer-implemented method for incrementally updating a set of hierarchically structured information, comprising by a computer system:
- accessing the hierarchically structured information wherein the hierarchically structured information is encoded such that an arrangement of nodes and corresponding data of the hierarchically structured information is not exposed and each node includes a corresponding node identifier that is not encoded, wherein a unique number is provided in the data for each node;
- generating an incremental update to the hierarchically structured information such that the incremental update identifies one or more of the nodes to be updated using one or more of the node identifiers that are not encoded;
- updating the hierarchically structured information by referring to the nodes using the node identifiers specified in the incremental update.

16. The computer-implemented method of claim 15, wherein updating the hierarchically structured information includes:
- deleting a specified node from the hierarchically structured information;
- updating a child pointer in a parent node of the specified node in the hierarchically structured information.

17. The computer-implemented method of claim 15, wherein updating a child pointer comprises:
- deleting the parent node of the specified node from the hierarchically structured information;
- replacing the parent node of the specified node in the hierarchically structured information.

18. The computer-implemented method of claim 15, wherein updating the hierarchically structured information includes:
- adding a specified node from the hierarchically structured information;
- updating a child pointer in a parent node of the specified node in the hierarchically structured information.

19. The computer-implemented method of claim 18, wherein updating a child pointer comprises:
- deleting the parent node of the specified node from the hierarchically structured information;
- replacing the parent node of the specified node in the hierarchically structured information.

20. A computer-implemented method for incrementally updating a set of hierarchically structured information, comprising by a computer system:
- encrypting the hierarchically structured information such that an arrangement of nodes and corresponding data of the hierarchically structured information is not exposed and each node includes a corresponding node identifier that is not encrypted, wherein encrypting comprises providing a unique number in the data for each node;
- generating an incremental update that identifies one or more of the nodes to be updated using one or more of the node identifiers that are not encrypted such that the incremental update is applied to the hierarchically structured information using the node identifiers specified in the incremental update.

21. The computer-implemented method of claim 20, wherein encrypting the hierarchically structured information includes:
- arranging the nodes in the hierarchically structured information into an unordered list;
- generating the node identifier for each of the nodes in the unordered list;
- encrypting the data for each node in the list.

22. The computer-implemented method of claim 21, wherein the incremental update specifies a new node including a new node identifier and a new set of encrypted data such that the incremental update is applied by adding the new node to the unordered list.

23. The computer-implemented method of claim 21, wherein the incremental update specifies a node to be deleted such that the incremental update is applied by deleting the specified node from the unordered list.

24. The computer-implemented method of claim 21, wherein the incremental update specifies a node to be replaced such that the incremental update is applied by replacing the specified node from the unordered list.

* * * * *

UNITED STATES PATENT AND TRADEMARK OFFICE
CERTIFICATE OF CORRECTION

PATENT NO. : 8,275,745 B2
APPLICATION NO. : 10/860977
DATED : September 25, 2012
INVENTOR(S) : Prakash Reddy et al.

Page 1 of 1

It is certified that error appears in the above-identified patent and that said Letters Patent is hereby corrected as shown below:

On the Title page, in field (54), in column 1, line 2, and in column 1, line 2, Title, delete "HIERARCHICALY" and insert -- HIERARCHICALLY --, therefor.

In column 9, line 25, in Claim 17, delete "claim 15," and insert -- claim 16, --, therefor.

Signed and Sealed this
Nineteenth Day of March, 2013

Teresa Stanek Rea
*Acting Director of the United States Patent and Trademark Office*